(12) United States Patent  
Hoffmann

(10) Patent No.: US 7,067,774 B2
(45) Date of Patent: Jun. 27, 2006

(54) HEATING ELEMENT

(75) Inventor: Michael Hoffmann, Statensee (DE)

(73) Assignee: Watlow GmbH, Kronau (DE)

( * ) Notice: Subject to any disclaimer, the term of this patent is extended or adjusted under 35 U.S.C. 154(b) by 0 days.

(21) Appl. No.: 11/127,500

(22) Filed: May 12, 2005

(65) Prior Publication Data

US 2005/0211693 A1 Sep. 29, 2005

Related U.S. Application Data

(63) Continuation of application No. PCT/EP03/12500, filed on Nov. 10, 2003.

(30) Foreign Application Priority Data

Nov. 12, 2002 (DE) ................................ 102 52 389

(51) Int. Cl. 
*H05B 3/08* (2006.01)

(52) U.S. Cl. ................... 219/541; 219/237; 219/543; 219/544; 219/545; 29/611; 29/460; 29/879; 29/882; 29/883

(58) Field of Classification Search ............... 219/541, 219/543–44, 535, 237; 29/611, 460, 879, 29/882–83

See application file for complete search history.

(56) References Cited

U.S. PATENT DOCUMENTS

| | | | |
|---|---|---|---|
| RE29,332 E | * | 8/1977 | Bilbro et al. ............... 165/164 |
| 4,131,788 A | * | 12/1978 | Fulbrook ..................... 219/535 |
| 4,486,650 A | | 12/1984 | Bridgstock et al. |
| 4,771,534 A | | 9/1988 | Gellert et al. |

FOREIGN PATENT DOCUMENTS

| | | |
|---|---|---|
| DE | 1062358 | 1/1950 |
| DE | 1841205 | 11/1961 |
| DE | 2511137 | 9/1976 |
| DE | 29510136 | 10/1995 |
| EP | 0607499 | 6/1998 |

OTHER PUBLICATIONS

PCT Patent Application (PCT/EP03/12500) 24 pages.
International Search Report (PCT/EP03/12500) 4 pages.
International Preliminary Examination Report (PCT/EP03/12500) 4 pages.

* cited by examiner

*Primary Examiner*—Shawntina Fuqua
(74) *Attorney, Agent, or Firm*—Harness, Dickey & Pierce, P.L.C.

(57) ABSTRACT

A heating element for placing on a pipe or nozzle comprises a current-carrying conductor connectable by means of connecting leads to a power supply. Each of the connecting leads has a terminal contact piece which can be engaged with a contact surface of the heating element. The contact piece can be clamped against the heating element by means of a clamping device. The contact piece rests loosely on the contact surface and the clamping force of the clamping device acts in a substantially normal manner to the contact surface and clamps the contact piece against said contact surface.

20 Claims, 4 Drawing Sheets

HEATING ELEMENT

CROSS-REFERENCE TO RELATED APPLICATIONS

The present application is a continuation of PCT application number PCT/EP03/12500, titled "HEATING ELEMENT ARRANGED ON A TUBULAR CONDUIT" filed Nov. 10, 2003, which claims priority from German application number DE 10252389.4, filed Nov. 12, 2002.

FIELD OF THE INVENTION

The invention relates to a heating element for placing on a pipe or nozzle, having a current-carrying conductor connectable by means of connecting leads to a power supply, each of the connecting leads having a terminal contact piece which can be engaged with a contact surface of the heating element, and in which a clamping device is provided by means of which the contact piece can be clamped against the heating element.

BACKGROUND OF THE INVENTION

In many fields of industrial manufacture it is desired and necessary to keep at an elevated temperature a pipe or a nozzle and consequently the medium located therein. Reference is made in exemplified manner hereinafter to a nozzle, e.g. in plastics processing, but similar problems arise with pipes or pipelines.

SUMMARY OF THE INVENTION

For heating the nozzle and the medium a sleeve-like heating element is externally engaged on the nozzle and has in its interior an electrical conductor which, on applying a voltage or when a current flows through it produces heat. The conductor can either be a heating coil formed from resistance wire, or a so-called thin or thick film heating element, where the heat is produced within the thick film when a current flows through it. Hereinafter in exemplified manner reference is made to a conductor in the form of a heating coil, but the invention is not restricted thereto and can be applied in the same way to a thin or thick film heating element.

At each of its ends the heating coil has a firmly connected connecting cable projecting from the outside of the heating element. By means of the connecting cable ends it is possible to connect the heating element to the cabling of a voltage supply. In order to replace a heating element installed in a machine, the connecting cables of the fitted heating element must be detached from the further extending cabling and removed from their cable run and then the heating element can be taken off. A new heating element must then be placed on the nozzle and its connecting cables must be introduced into the cable run of the machine and connected to the further extending cabling. Particularly when replacing only one heating element, this procedure is very complicated. If e.g. as a result of a product change, it is necessary to simultaneously replace a plurality of heating elements, a very long changeover time is required in which the machine is unable to operate.

To facilitate the connection and replacement of the heating element, in U.S. Pat. No. 4,486,650 there is a detachable connection between the heating coil integrated into a tubular coupling and the connecting leads. Pins are provided on the outer circumferential surface of the coupling and extend substantially radially and on each of which can be mounted a sleeve-like plug of the connecting leads. The electrically conductive connection is brought about between the outer surface of the pins and the inner surface of the plugs. To prevent the plugs from dropping down from the pins, a clamping device in the form of a box nut is provided and by means thereof the plugs can be clamped against the heating element in the longitudinal direction of the pins. Although this structure leads to a heating element which can be easily connected and replaced, this leads to the disadvantage that the electrical contact is dependent on the accuracy of fit between the pins and the plugs and this can be disadvantageously influenced, particularly under the action of heat. Especially in the case of a thin or thick film heating element, for a good functioning of the heating element it is necessary for there to be a large-area engagement in all operating states between the contact surface of the heating element and the contact pin or plugs of the connecting leads and this cannot be obtained with the structure according to U.S. Pat. No. 4,486,650.

The problem of the invention is to provide a heating element of the aforementioned type, where a good electrical connection is reliably ensured.

In the case of a heating element of the aforementioned type, the invention solves this problem with the characterizing features of claim 1. The connecting leads have in each case a terminal contact piece, which is loosely placed on the contact surface of the heating element and is clamped against the contact surface solely by the clamping force of the clamping device. The clamping force of the clamping device is directed substantially in normal manner to the contact surface, i.e. the clamping device clamps the contact surface and the bearing surface of the contact piece directly against one another, which ensures a large-area engagement in all operating states.

Thus, according to the invention, the connecting leads are detachably directly applied to the heating element, so that on replacing the latter it is merely necessary to release the connection between it and the connecting leads, without the latter having to be removed from their cable run. In order to keep the contact piece in full-area contact with the contact surface when operating the heating element, the clamping device is provided and clamps the contact piece against the contact surface. As a result of the release of the clamping device, the contact piece comes free from the contact surface, so that the heating element can be removed and replaced.

According to a further development of the invention the contact surface is located on the radially outer side of the heating element. This leads to the advantage that a radially inwardly directed clamping force securely clamps the contact piece against the contact surface.

The clamping force produced by the clamping device and by means of which the contact piece is pressed against the contact surface can e.g. be produced by a spring. According to a preferred development of the invention the clamping device incorporates a locking screw. On tightening the locking screw the necessary clamping force is exerted on the contact piece and clamps it against the contact surface.

A heating element of the aforementioned type is normally surrounded by a rack-mounted reflector tube, which is intended to prevent excessive heat radiation radially to the outside. According to the invention said reflector tube can be provided with a taphole. The locking screw is then in engagement with the thread of the reflector tube taphole and can be radially adjusted by turning relative to said tube.

It is alternatively also possible to surround the heating element or reflector tube with a clamp or clip, so that the necessary clamping force is produced for keeping the contact piece in engagement with the contact surface.

Generally the heating element is surrounded by an insulating jacket. According to a possible development of the invention, the contact surface is formed in a recess of the heating element jacket, i.e. does not project radially outwards from the heating element. Alternatively the contact surface can be constructed on a radially projecting connection part of the heating element, which can e.g. be a connection socket or bolt.

In order to ensure a large-area engagement between the contact surface and the contact piece, the contact surface and preferably also the bearing surface of the contact piece are made smooth, the contact piece with its bearing surface complimentary to the contact surface engaging in large-area manner on said contact surface. The term "complimentary" means that the bearing surface of the contact piece forms the geometrically negative counterpart to the contact surface. If the contact surface is substantially planar, the bearing surface of the contact piece is also substantially planar. With a convex contact surface, the bearing surface has a concave shape with corresponding dimensions. This reliably ensures that there is a large-area electrical contact between the contact surface and the bearing surface of the contact piece.

The contact surface and contact piece must be externally insulated. To this end and according to a further development of the invention the contact piece is surrounded by an insulator, the clamping force being preferably applied indirectly to the contact piece via the insulator. The insulator can have a rigid construction. However, according to a further development of the invention the insulator is elastic and in particular springy, which is e.g. brought about in that the insulator is made from a plastic foam material. As a result of the clamping force the insulator is deformed and produces a reaction spring tension acting in uniform manner on the contact piece.

To ensure that the heating element is reliably supplied with electric power, it is necessary for the contact piece and contact surface to have a predetermined, mutual relative orientation. To ensure that this predetermined relative position is not changed during the operation of the heating element, according to a further development of the invention the heating element can be fixed so as not to rotate on the pipe or nozzle, so that the contact piece and contact surface are maintained with a predetermined orientation.

BRIEF DESCRIPTION OF THE DRAWINGS

Further details and features of the invention can be gathered from the following description of embodiments and with reference to the attached drawings, wherein show.

DETAILED DESCRIPTION OF THE PREFERRED EMBODIMENTS

Figure 1:
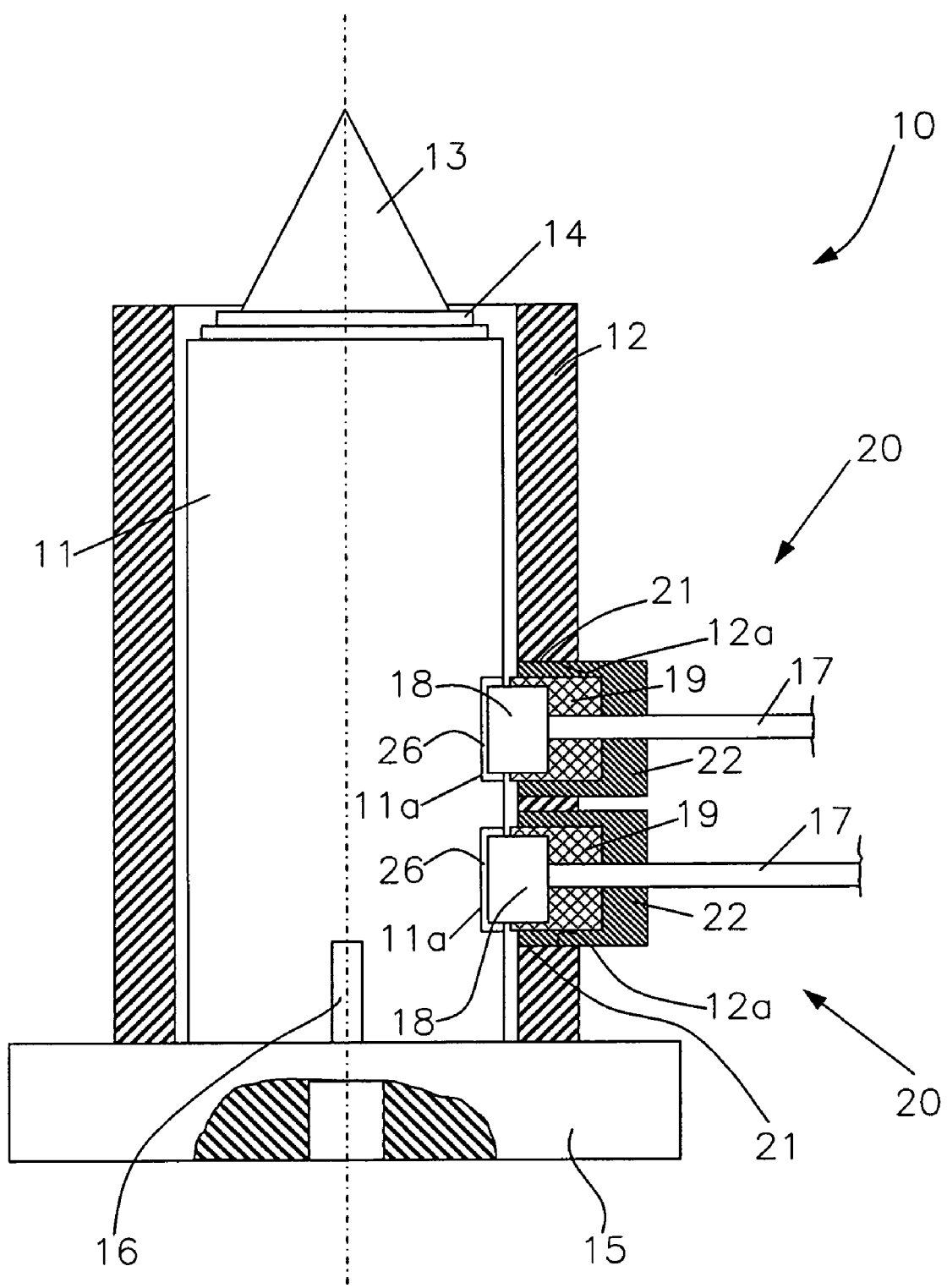
FIG. 1 is cross-sectional view through a fitted heating element according to a first embodiment of the present invention.

FIG. 1 shows a heating device 10 by means of which it is possible to heat a medium flowing in an only intimated nozzle 13. The heating device 10 incorporates a rack-mounted base plate 15 on which is held a reflector tube 12. The nozzle 13 runs with radial spacing within the reflector tube 12. A sleeve-like heating element 11 is axially engaged on the nozzle 13 and is located between the latter and the outer reflector tube 12 and is fixed so as not to rotate by means of a rotation preventer 16, which is constructed on the base plate 15. The heating element 11 is axially fixed on the nozzle 13 by means of a securing device 14.

In the circumferential surface of the heating element 11 are formed two axially spaced recesses 11a in each of which is provided a contact surface 26 of a not shown electrical conductor positioned in or on the heating element 11.

A taphole 12a with an internal thread 21 is formed in the reflector tube 12 in areas adjacent to or facing the contact surfaces 26. An electrical connecting lead 17 has a terminal contact piece 18 which is passed through the taphole 12a and can be placed loosely on the contact surface 26 of the heating element 11. A locking screw 22, constructed as a box nut, is displaceably provided on the connecting lead 17 and is filled in its interior with an elastic insulator 19, which at least partly surrounds and shields the contact piece 18. The locking screw 22 has an external thread, which engages with the internal thread 21 of the taphole 12a of the reflector tube 12. On screwing the locking screw 22 into the taphole of the reflector tube 12, the locking screw 22 is moved radially inwards relative to the heating element 11, so that the contact piece 18 projecting on the inside of the locking screw 22 is clamped against the contact surface 26 of the heating element 11. The clamping force produced by the locking screw 22 acts radially inwards and therefore substantially normal to the contact surface 26 of the heating element 11. Thus, as a result of the clamping force, the contact piece 18 is in large-area engagement on the contact surface 26.

To replace the heating element 11, the locking screws 22 are unscrewed from the taphole 12a of the reflector tube 12 to such an extent that the connecting leads 17 with the contact piece 18 are disengaged from the contact surface 26 of the heating element 11. After releasing the axial securing device 14, the heating element 11 can be removed axially from the nozzle 13. A new heating element is then engaged on the nozzle and electrically connected by screwing in the locking screws 22, in that the contact pieces 18 are clamped against the contact surfaces of the new heating element.

Figure 2:
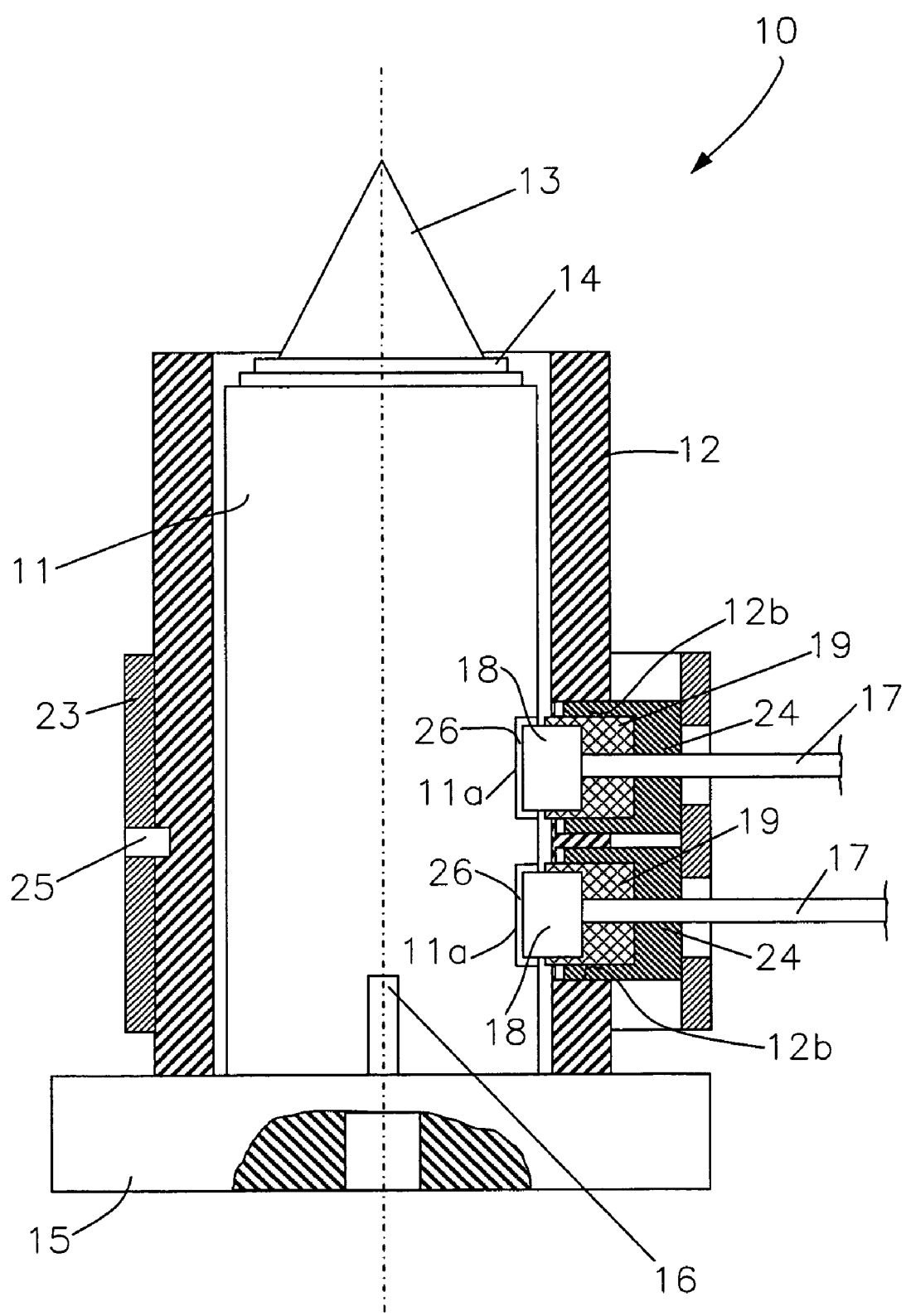
FIG. 2 is a cross-sectional view through a fitted heating element according to a second embodiment of the present invention.

Whereas in the development according to FIG. 1 the clamping force by means of which the contact piece 18 is clamped against the contact surface 26, is produced by a locking screw 22 in engagement with the reflector tube 12, FIG. 2 shows an alternative construction where a spring clip 23 is located on the outside of the reflector tube 12 and is fixed on the latter by means of a pin 25. A cup-shaped thrust piece 24 is located in a hole 12b of the reflector tube 12 and corresponds to the aforementioned locking screw with the exception of the thread and receives the insulator 19, which surrounds in the indicated manner the contact piece 18. The thrust piece 24 is located in radially displaceable manner in the hole 12b and is subject to a radially inwardly directed clamping force by means of the spring clip 23, so that the contact piece 18 is clamped against the contact surface 26 of the heating element 11. For replacing the heating element 11 either the spring clip 23 is released or the contact pieces 18 together with the insulators 19 and thrust pieces 24 are drawn radially outwards counter to the spring tension of the spring clip 23 to such an extent that the heating element 11 comes free and can be drawn off the nozzle 13.

Figure 3:
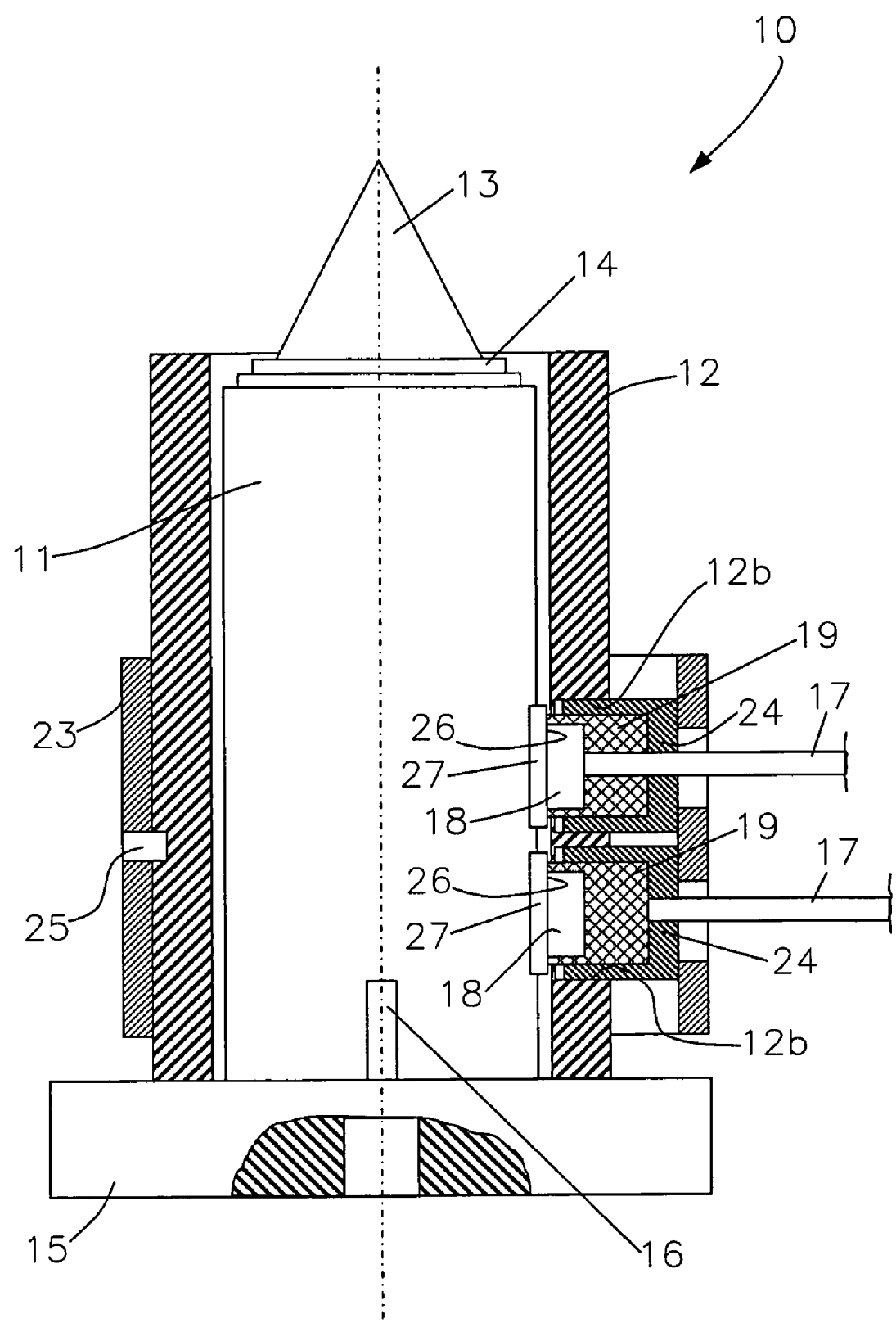
FIG. 3 is a cross-sectional view through a fitted heating element according to a third embodiment of the present invention.

Whilst in the two aforementioned embodiments the contact surface 26 is in each case formed in a recess 11a of the jacket of the heating element 11, FIG. 3 shows a variant in which the heating element 11 has two radially outwardly projecting connection parts 27, which can in each case be engaged with a contact piece 18. The connection parts 27 can be connecting sockets or bolts. With regards to the further structure the heating device 10 of FIG. 3 corresponds to that of FIG. 2.

Figure 4:
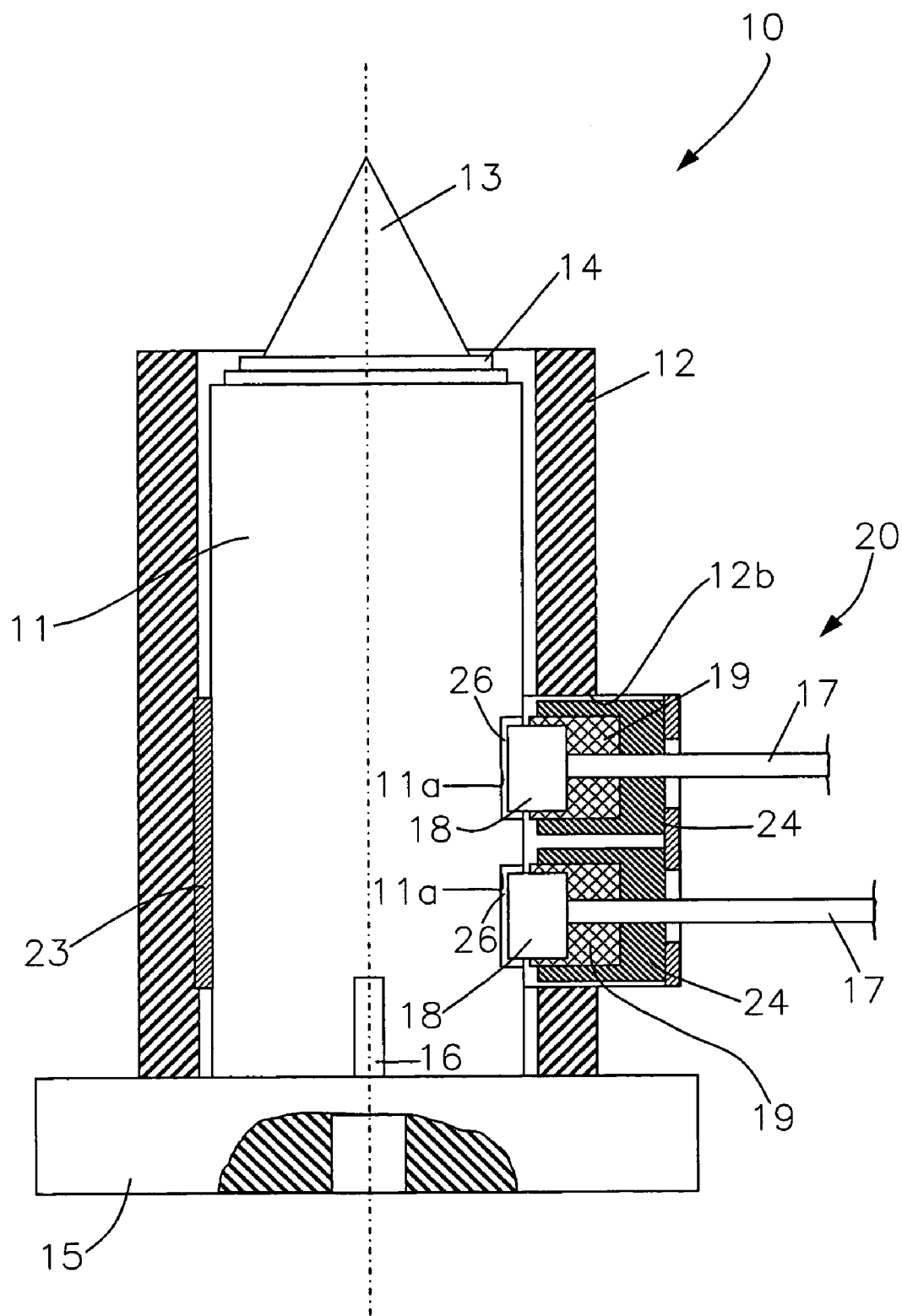
FIG. 4 is a cross-sectional view through a fitted heating element according to a fourth embodiment of the present invention.

FIG. 4 shows a variant of the clamping device according to FIG. 2. The clamping device according to FIG. 2 has a spring clip located on the outside of the reflector tube 12. Also in the variant according to FIG. 4 a corresponding spring clip is provided, but directly embraces the heating element 11 and passes through the reflector tube 12 at a cutout 12b, so that it can act in the indicated manner on the radially outer surface of the thrust pieces 24 and can move same radially inwards, so that the clamping force, accompanied by the interposing of the insulators 19, clamps the contact pieces 18 radially inwards onto the radially outer contact surfaces 26 of the heating element 11.

What is claimed is:

1. A heating element for placing on a pipe or nozzle (13), with a current-carrying conductor connectable by means of connecting leads (17) to a power supply, the connecting leads (17) in each case having a terminal contact piece (18) which can be engaged with a contact surface (26) of the heating element (11), and where a clamping device (20) is provided by means of which the contact piece (18) can be clamped against the heating element (11), characterized in that the contact piece (18) rests loosely on the contact surface (26) and that the clamping force of the clamping device (20) acts in a substantially normal manner to the contact surface (26) and clamps the contact piece (18) against the contact surface (26).

2. The heating element according to claim 1, characterized in that the contact surface (26) is located on the radially outer side of the heating element (11).

3. The heating element according to claim 1, characterized in that the contact surface (26) is formed in a recess (11a) of a jacket of the heating element (11).

4. The heating element according to claim 1, characterized in that the contact surface (26) is formed on a radially projecting connection part (27) of the heating element (11).

5. The heating element according to claim 1, characterized in that the contact surface (26) is smooth and that the contact piece (18) with a complimentary bearing surface engages in large-area manner on the contact surface (26).

6. The heating element according to claim 1, characterized in that the clamping device (20) incorporates a locking screw (22).

7. The heating element according to claim 6, characterized in that the locking screw (22) is in engagement with a thread (21) of a reflector tube (12) surrounding the heating element (11).

8. The heating element according to claim 1, characterized in that the clamping device (20) incorporates a clamp (23) at least partly embracing the heating element (11).

9. The heating element according to claim 1, characterized in that the contact piece (18) is surrounded by an insulator (19).

10. The heating element according to claim 9, characterized in that the clamping force can be applied to the contact piece (18) via the insulator (19).

11. The heating element according to claim 9, characterized in that the insulator (19) is elastic.

12. The heating element according to claim 9, characterized in that the insulator (19) is formed from a foam material.

13. The heating element according to claim 1, characterized in that the heating element (11) can be secured in rotation-prevented manner on the pipe or nozzle (13).

14. A connector for use in a heater having a heating element with a contact surface, the connector comprising:
   a terminal contact piece; and
   a clamping device disposed proximate the terminal contact piece and operable to clamp the terminal contact piece to the contact surface of the heating element,
   wherein the terminal contact piece is adapted to rest loosely against the contact surface of the heating element and the clamping device acts in a substantially normal manner to clamp the terminal contact piece against the contact surface of the heating element.

15. The connector according to claim 14, characterized in that the clamping device incorporates a locking screw.

16. The connector according to claim 14, characterized in that the clamping device incorporates a clamp that at least partly embraces the heating element.

17. The connector according to claim 14, further comprising an insulator surrounding the terminal contact piece.

18. A heater having a heating element and a contact surface comprising:
   a terminal contact piece;
   an insulator surrounding the terminal contact piece; and
   a clamping device disposed proximate the terminal contact piece and operable to clamp the terminal contact piece to the contact surface of the heating element,
   wherein the terminal contact piece is adapted to rest loosely against the contact surface of the heating element and the clamping device acts in a substantially normal manner to clamp the terminal contact piece against the contact surface of the heating element.

19. The heater according to claim 18, characterized in that the clamping device incorporates a locking screw.

20. The connector according to claim 18, characterized in that the clamping device incorporates a clamp that at least partly embraces the heater.

* * * * *